US005233154A

United States Patent [19]

Horiai et al.

[11] Patent Number: 5,233,154

[45] Date of Patent: Aug. 3, 1993

[54] PLASMA TORCH

[75] Inventors: Kunio Horiai; Yuichi Takabayashi, both of Hiratsuka, Japan

[73] Assignee: Kabushiki Kaisha Komatsu Seisakusho, Tokyo, Japan

[21] Appl. No.: 809,478

[22] PCT Filed: Jul. 20, 1990

[86] PCT. No.: PCT/JP90/10802

§ 371 Date: Dec. 18, 1991

§ 102(e) Date: Dec. 18, 1991

[87] PCT Pub. No.: WO90/16140

PCT Pub. Date: Dec. 27, 1990

[30] Foreign Application Priority Data

Jun. 20, 1989 [JP] Japan .................................. 1-72919
Jun. 20, 1989 [JP] Japan .................................. 1-72921

[51] Int. Cl.[5] ................................................ B23K 9/00

[52] U.S. Cl. .......................... 219/121.48; 219/121.51; 219/121.5; 219/75

[58] Field of Search ........... 219/121.5, 121.48, 121.52, 219/121.51, 121.39, 75

[56] References Cited

U.S. PATENT DOCUMENTS

| | | | |
|---|---|---|---|
| 4,383,559 | 6/1983 | Rotolico et al. | 219/121.5 |
| 4,748,312 | 5/1988 | Hatch et al. | 219/121.52 |
| 4,973,816 | 11/1990 | Haberman | 219/121.48 |
| 5,124,525 | 6/1992 | Severance, Jr. et al. | 219/121.5 |
| 5,132,512 | 7/1992 | Sanders et al. | 219/121.5 |

FOREIGN PATENT DOCUMENTS

| | | |
|---|---|---|
| 56-4351 | 1/1981 | Japan . |
| 59-120367 | 7/1984 | Japan . |
| 59-120369 | 7/1984 | Japan . |
| 63-11187 | 1/1988 | Japan . |
| 63-19978 | 2/1988 | Japan . |
| 63-250097 | 10/1988 | Japan . |
| 1-150480 | 6/1989 | Japan . |

*Primary Examiner*—Mark H. Paschall
*Attorney, Agent, or Firm*—Richards, Medlock & Andrews

[57] ABSTRACT

In a plasma torch, the contact surface (61) between the nozzle (6) and the swirler (5), the contact surface (4*b*) between the swirler (5) and the insulating cylindrical body (4), the contact surface between the insulating cylindrical body (4) and the electrode (3), and the contact surface (3*a*) between the electrode (3) and the electrode table (2) are arranged in line from the nozzle (6) to the torch body (1). The inner diameter (d1) of the portion of insulating cylindrical body (4) positioned in contact with the flange (31) of the electrode (3) is smaller than the inner diameter (d2) of the flat surface (4*b*) of insulating cylindrical body (4) which is in contact with the end of swirler (5). An upper stepped chamber (65) or an upper tapered chamber (66) can be formed in the cylindrical portion (62) of the nozzle (6) above the swirler (5) which upper chamber has a diameter larger than that of the swirler (5) to permit easy removal of the swirler (5) from the cylindrical portion (62).

20 Claims, 3 Drawing Sheets

PLASMA TORCH

FIELD OF THE INVENTION

The present invention relates to a plasma torch for use in cutting or welding metallic material.

BACKGROUND ART

A conventional plasma torch comprises a torch body, an electrode table, an electrode, an insulating cylindrical body, a swirler and a nozzle as the main component elements thereof, the plasma torch being constituted by simply fastening the outer surface of the electrode table to the nozzle in the above-described sequential order and by inserting the thus-fastened elements into the torch body. Another known example is constituted in such a manner that a cap is fitted to the outer surface of the leading portion of the plasma torch and thereby the same is protected. Another known example is constituted in such a manner that the insulating cylindrical body and the swirler are integrally molded (for example, see Japanese Patent Utility Model Laid-Open No. 63-19978). Since the conventional plasma torches have been respectively constituted in the above-described simple manner, they can easily be manufactured. However, there arises the following problems when they are used:

(1) The insulating cylindrical body can be broken.

(2) The contact part between the electrode table and the electrode can be melted.

The reason why the above-described problems take place will be specifically described with reference to a plasma torch shown in FIG. 5. When the plasma torch is used, its electrode 3, which is one of the consumables, must be exchanged on occasion. In a case where the electrode 3 is mounted, a cap 7 is screwed so as to cause the electrode 3 to be fitted to the outer surface of an electrode table 2 via an insulating cylindrical body 4 and a nozzle 6. At this time, the force applied to the cap 7 acts on an outer peripheral portion 42 of the insulating cylindrical body 4. However, an inner peripheral portion 41 of the insulating cylindrical body 4 gives the electrode 3 the insertion force. That is, shearing force is generated in the insulating cylindrical body 4. Since the insulating cylindrical body 4 is usually made of ceramic, it has a disadvantageous point in that it is too weak against an impact or an excessively large stress, though it has satisfactory heat resistance. Therefore, the insulating cylindrical body 4 will be gradually broken, causing the force with which the electrode 3 is brought into contact with the electrode 3 to be reduced. As a result, there arises a problem in that a defective electrical connection (that is, defective contact) takes place and thereby the contact part 3*b* can be melted.

The nozzle of the plasma torch is, as shown in FIG. 6, arranged in such a manner that a small hole 11 for jetting out plasma arcs is formed at the central portion of the substantially conical leading portion thereof. Furthermore, a swirler 5 for introducing an operating gas in the form of a swirling flow or an axial flow into a portion between the electrode 3 and the nozzle 6 is fitted within a hole formed in a cylindrical portion 62 so that the electrode 3 is held via the swirler 5 and the insulating body 4.

Since the electrode 3 and the nozzle 6 of the plasma torch consume whenever the plasma arc generates, they must be exchanged when they reach the limit in terms of the use. In this case, since the swirler 5 can be further used, it is again used after it has been removed from the consumed nozzle 6. However, as for the nozzle 6, only a small gap, to which the swirler 5 can be fastened while preventing looseness, is permitted to be present in the hole formed in the cylindrical portion of the nozzle 6 through the overall length thereof. Therefore, when the consumed nozzle 6 is decomposed, it takes too much time to complete an operation of removing the swirler 5 from the nozzle 6. Usually, although the electrode 3 and the insulating body 4 can easily be removed from the nozzle 6, the swirler 5 is left in the nozzle 6 in a state in which the same is fastened there.

When the nozzle 6 in the above-described state is turned upside down and a small shock is applied to it, the swirler 5 can sometimes be removed from the nozzle 6. However, the swirler 5 cannot always be removed if the cylindrical portion 62 of the nozzle 6 is deformed or small dust is caught at a space between the swirler 5 and the nozzle 6 during the removal movement of the swirler 5. In a case where the swirler 5 cannot be removed even if the shock is given to the nozzle 6, the nozzle 6 must be cut to take the swirler 5. Therefore, there arises a problem in that the above-described nozzle cutting work causes the work for assembling/disassembling the plasma torch to take too much time.

Accordingly, a first object of the present invention is to provide a plasma torch having an insulating cylindrical body which cannot be easily broken and having a contact part between the electrode table and the electrode which cannot easily be melted. Furthermore, a second object of the present invention is to provide such a plasma torch having an improved structure. A third object of the present invention is to provide a plasma torch having a swirler which can easily be removed from the nozzle at the time of disassembling the plasma torch.

SUMMARY OF THE INVENTION

In order to achieve the first object, a plasma torch according to the present invention is constituted in such a manner that: the electrode table 2 has a flange 21 on the outer surface thereof; the electrode 3 has, on the outer surface of the end portion thereof which confronts the electrode table 2, a flange 31 which is positioned in contact with the surface of the flange 21 adjacent to the nozzle 6; the end surface of the insulating cylindrical body 4 adjacent to the electrode table 2 is positioned in contact with the surface of the flange 31 adjacent to the nozzle 6 and the insulating cylindrical body 4 has a stepped portion 4*b* in its portion adjacent to the nozzle 6; the end surface of the swirler 5 adjacent to the electrode table 2 is positioned in contact with the surface of the stepped portion 4*b* of the insulating cylindrical body 4 adjacent to the nozzle 6; and the end surface of the swirler 5 is positioned in contact with a nozzle directional inner side surface 61 of the nozzle 6 (see FIG. 1). An inner diameter d1 of the insulating cylindrical body 4 of a surface which is positioned in contact with the flange 31 of the electrode is smaller than an inner diameter d2 of the radially extending annular portion 4*b* of the insulating cylindrical body 4, which is positioned in contact with the swirler 5.

In order to achieve the second object, an inner cap 7 has a first end portion which circumscribes the nozzle 6 and a second end potion which is secured to the outer surface of the torch body 1. An outer cap 8 has a first end portion which circumscribes the inner cap 7, and a second end portion which is secured to the outer surface of the torch body 1. An assist gas passage 82 is formed between the caps 7 and 8, and an assist gas jetting hole 81 is formed in an end portion of the cap 8 (see FIG. I). The insulating cylindrical body 4 and the swirler 5 can be integrally molded.

In order to achieve the third object, a first hole or chamber 64 is formed in the cylindrical portion 62 of the body of nozzle 6 such that the wall surface of the chamber 64 confronts the whole or a part of the outer wall surface of the swirler 5 when the swirler 5 is placed in the cylindrical portion 62 of the nozzle 6, and a second hole or chamber 65 is formed in the cylindrical portion 62 of the body at a position between the top end portion of the first chamber 64 and the top end portion of the cylindrical portion 62, the second chamber 65 having a diameter which is larger than that of the first chamber 64. A tapered chamber 66, the larger end of which is placed at the top end portion of the cylindrical portion 62, can be formed instead of the second chamber 65 (see FIGS. 3 and 4).

As a result of the thus-arranged structure, the contact surfaces of the above-described elements are arranged in line running from the nozzle 6 to the torch body 1. Therefore, the insertion force applied in a direction from the nozzle 6 to the electrode table 2 becomes substantially the compressive stress in the abovedescribed elements. As a result, although the insulating cylindrical body 4 can be broken, it cannot easily be broken in comparison to the conventional structure. As a result, melting of the contact surface 3a due to the defective contact between the electrode 3 and the electrode table 2 can be prevented. On the other hand, the contact force between the electrode 3 and the electrode table 2 is, as can be understood from the above-made description, substantially the same as the insertion force applied via the nozzle 6. As a result, further reliable contact can be realized at the contact surface 3a so that the prevention of melting can be further completely performed.

The contact force applied via the nozzle 6 sometimes generates internal stress, in addition to the compressive stress, depending upon the shape or the state of fitting of the elements. Even if the internal stress is generated, insertion force F can be made to be substantially pure compressive stress—$\sigma$ in each element by determining the inner diameter of the insulating cylindrical body 4. As a result, the above-described operation and effect can further be improved.

The above-described structure of the plasma torch can be applied to a plasma torch provided with the caps 7 and 8 and having an assist gas jetting function and as well applied to a plasma torch arranged in such a manner that the insulating cylindrical body 4 and the swirler 5 are integrally molded.

Furthermore, the interior opening of the cylindrical portion 62 of the nozzle 6 can have a stepped portion 54 or a tapered portion 66 for ease of removal of the swirler 5. The interior opening in the cylindrical portion 62 of nozzle 6 can be in the form of a lower chamber 64 for holding the swirler 5 and an upper chamber connected to the lower chamber, with the diameter of the portion of the interior opening above the swirler 5 being enlarged with respect to the whole or a part of the swirler seat. The mounting/removing of the swirler can significantly easily be performed in comparison to the conventional structure. In particular, the removal of the swirler 5 from the nozzle 6 at the time of disassembling the plasma torch can be smoothly performed even if the cylindrical portion is deformed to some degree or small dust adheres to the inner surface of the cylindrical portion.

BEST MODE FOR CARRYING OUT THE INVENTION

Best modes of a plasma torch according to the present invention will specifically be described with reference to the drawings. The best mode according to a first embodiment of the invention will be described with reference to FIGS. 1 and 2. The best mode according to the second and third embodiments of the invention will be described with reference to FIGS. 3 and 4.

Figure 1:
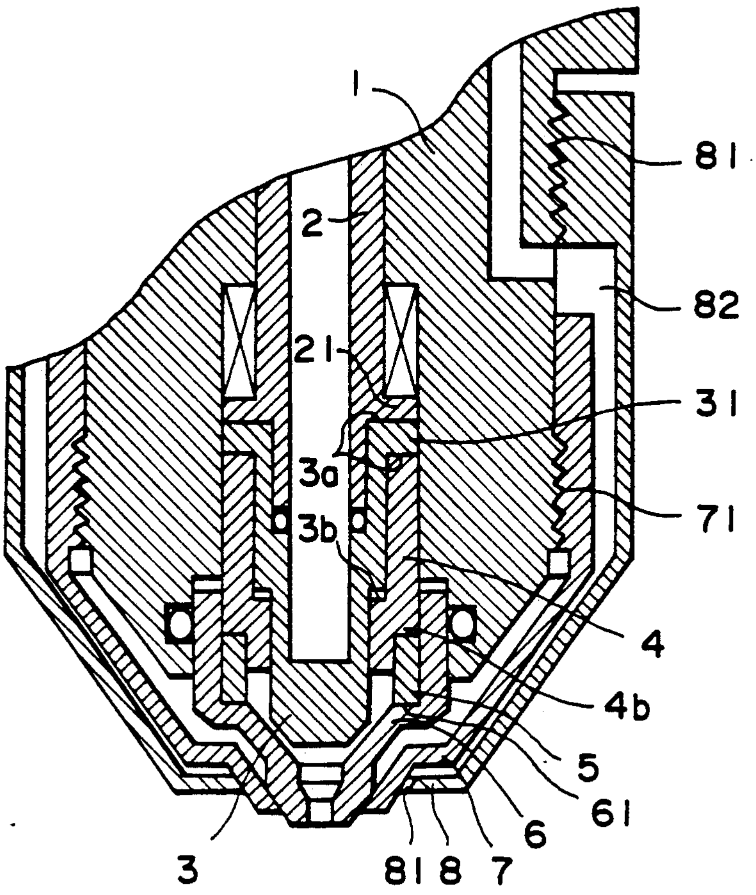
FIG. 1 is a partial enlarged cross sectional view which illustrates a plasma torch according to the present invention.
Figure 2:
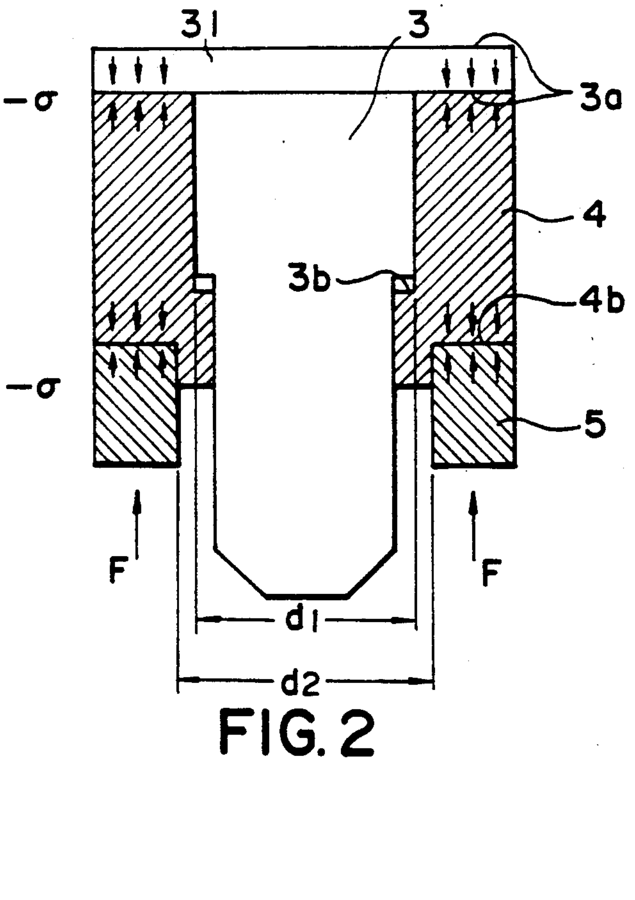
FIG. 2 is a partial enlarged cross sectional view of the electrode, insulator and swirler assembly of FIG. 1.

Referring to FIG. 1, an electrode 3 is fastened to the outer surface of the leading portion of an electrode table 2 included in a torch body 1. The lower or leading portion of the electrode table 2 has a flange 21 for enlarging the contact area between the electrode table 2 and the electrode 3. The outwardly extending annular flange 21 at the upper end of the electrode 3 has an upper flat portion 3a, which confronts the flange 21, and a stepped portion 3b the outer cylindrical surface thereof. Furthermore, an insulating cylindrical body 4 is fastened to the outer surface of the electrode 3 in such a manner that the body 4 is brought into contact with the lower flat portion 3a on the underside of flange 31. In addition, by utilizing the stepped portion 4b formed on the outer surface of the insulating cylindrical body 4, a swirler 5 for generating a swirling gas is fastened to the above-described outer surface of insulating cylindrical body 4. Furthermore, a conical and cylindrical nozzle 6 is fastened to the outer surface of the swirler 5. The above-described elements are inserted into the torch body 1. As a result of the thus-arranged structure, an annular contact surface 61 between the nozzle 6 and the swirler 5, an annular contact surface 4b between the swirler 5 and the insulating cylindrical body 4, a lower annular contact surface 3a between the insulating cylindrical body 4 and the electrode 3, and an upper annular contact surface 3a between the electrode 3 and the electrode table 2 are arranged on a line running from the nozzle 6 to the torch body 1. As a result, insertion force acting from the nozzle 6 to the electrode table 2 becomes substantially only the compressive stress in the above-described elements.

In order to cause substantially only compressive stress—$\sigma$ to be applied, the insulating cylindrical body 4 is arranged in such a manner that the outer surface of the cylindrical portion thereof which is below the stepped portion 4b for fastening the swirler 5 has an outer diameter d2 which is greater than the inner diameter d1 of the annular flat portion 3a which confronts the flange 21 (See FIG. 1) of the electrode 2. That is, the structure is arranged such a relation of d2>d1 is held. By providing this relationship of d1 and d2, the insertion force F becomes pure compressive force—94 in each element.

The plasma torch shown in FIG. 1 is constituted such that a conical portion of inner cap 7 contacts the outer surface of the nozzle 6 adjacent the nozzle outlet while a cylindrical portion of the inner cap 7 is fastened to the outer surface of the torch body 1 by threaded joint 71. A conical portion of an outer cap 8 contacts the outer surface of the conical portion of inner cap 7 adjacent the outlet of nozzle 6 while a cylindrical portion of outer cap 8 is fastened to the torch body 1 by threaded joint 80. A passage 82 for passing an assist gas is formed between the inner cap 7 and the outer cap 8. The leading portion of the outer cap 8 has a jet hole 81 formed therein for the purpose of jetting out the assist gas against a portion of the workpiece to be machined. The assist gas is used for the purpose of shielding the plasma flow and the portion of the workpiece to be machined from the outside air at the time of performing the plasma machining work. Furthermore, referring to the drawing, "O" rings, magnets and the like are disposed in order to prevent an undesirable introduction of cooling water and to support the established inward or outward fastening of elements. In another embodiment of the invention, the swirler 5 and the insulating cylindrical body 4 are integrally molded. Therefore one pair of contact surfaces can be omitted from the structure, and the rigidity can be improved. Therefore, an effect can be obtained to prevent the breakage and to improve the efficiency in transmitting insertion force F.

According to the above-described embodiments, the breakage of the insulating cylindrical body 4 can satisfactorily be prevented and melting due to the defective electrical connection between the electrode table 2 and the electrode 3 can be prevented.

Figure 3:
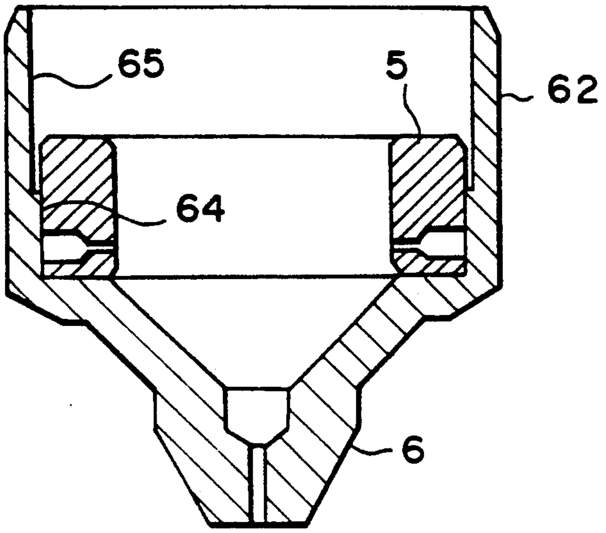
FIG. 3 is a partial enlarged cross sectional view of a nozzle and swirler structure which can be utilized in the plasma torch of FIG. 1.

Referring now to FIG. 3, the cylindrical portion 62 of the nozzle 6 of the plasma torch has a first, lower chamber formed therein for the purpose of fastening the swirler 5 and a second, upper chamber 65 formed therein in such a manner that the diameter of the upper chamber 65 is slightly larger than that of the first chamber 64. Specifically, the diameter of the first chamber 64 is larger than the outer diameter of the swirler 5 by about 0.05 mm and the depth of the same is made to be about two-third of the length of the swirler 5 in its axial direction. As shown in FIG. 3, the length of the swirler 5 in its axial direction is less than the combined axial length (depth) of the first chamber 64 and the second chamber 65. The diameter of the second chamber 65 is made to be larger than the diameter the first chamber 64 by about 0.5 mm when measured at a position above the first chamber 64.

When the nozzle 6 thus-constituted is turned upside down and a light shock is given to the same, the swirler 5 can easily be removed. Furthermore, the swirler 5 can significantly easily be fastened to the nozzle 6.

Figure 4:
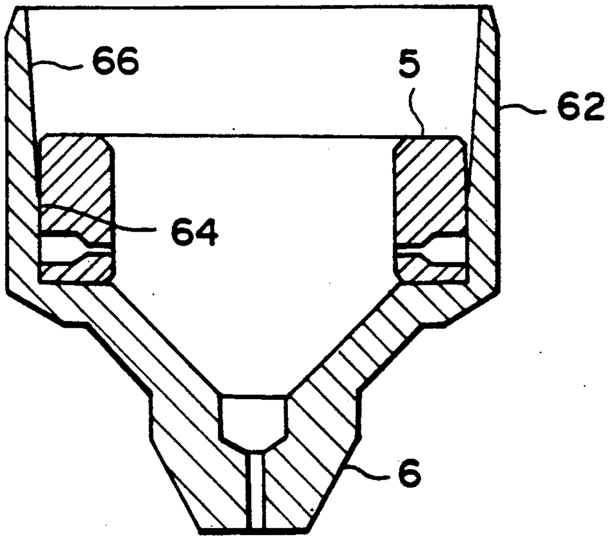
FIG. 4 is a partial enlarged cross sectional view of a nozzle and swirler structure which can be utilized in the plasma torch of FIG. 1.
Figure 5:
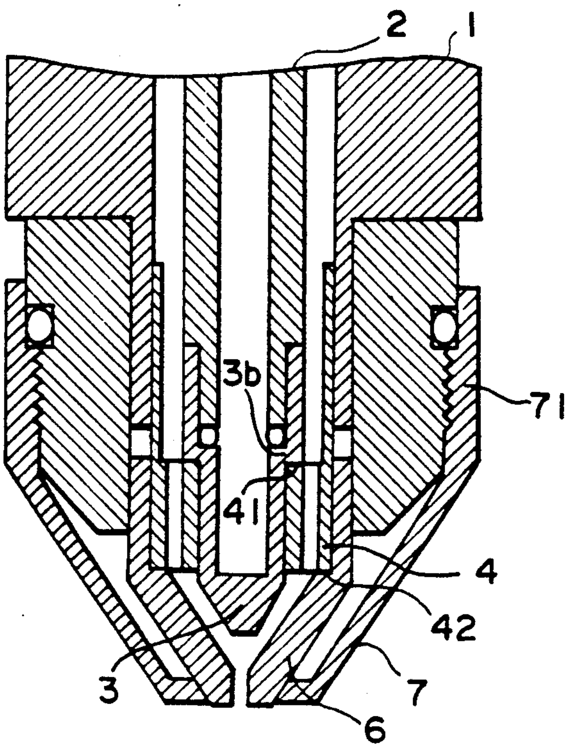
FIG. 5 (Prior Art)
FIG. 5 is a partial enlarged cross sectional view of a conventional plasma torch.
Figure 6:
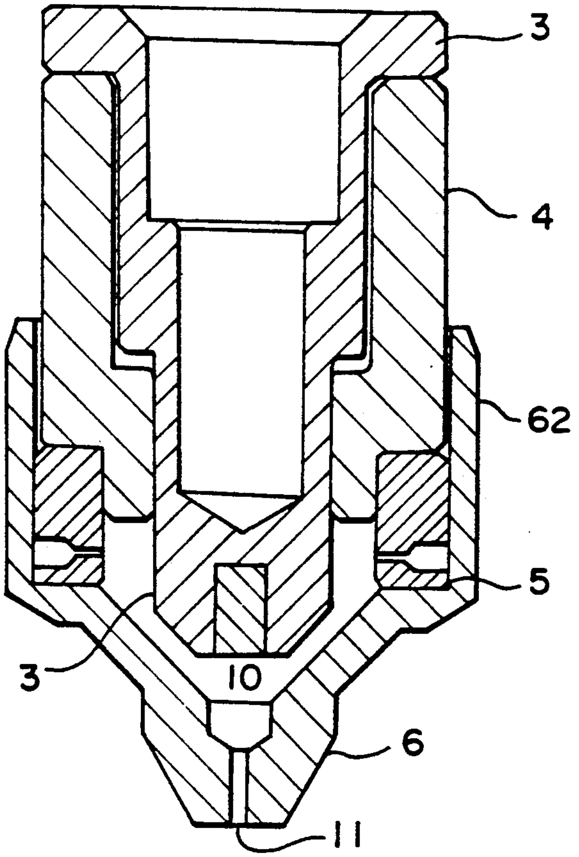
FIG. 6 (Prior Art)
FIG. 6 is an enlarged cross sectional view which illustrates the leading portion of another conventional plasma torch.

FIG. 4 illustrates an alternative to the structure in which the first chamber 64 is formed in the inner surface of the cylindrical portion 62 of the nozzle 6, and a tapered chamber 66 is formed to extend from chamber 64 to the open top end of cylindrical portion 62, with the larger end of chamber 66 being at the open top end of the cylindrical portion 62. The depth of the first chamber 64 is made to be about two-third of the length of the swirler 5 in its axial direction. Also in this case, the swirler 5 can significantly easily be fastened/removed.

According to the above-described embodiments, the swirler 5 can significantly easily be fastened/removed while accurately maintaining the concentricity between the electrode 3 and the nozzle 6 and the distance from the bottom end portion of the electrode 3 and an arc control portion of the nozzle 6. Therefore, the efficiency in the disassembling/assembling work can significantly be improved. Furthermore, the hole machining range in which a desired fitness accuracy must be established can be narrowed, causing the cost required to machine the nozzle to be reduced.

Although the depth of the first chamber 64 to which the swirler 5 is fastened is made to be about two-third of the length of the swirler 5 in its axial direction, the present invention is not limited to this. The depth of the first chamber 64 may be in a range in which the swirler 5 can be correctly seated at a predetermined position. Also the diameter of the second chamber 65 shown in FIG. 3 and the larger diameter of the tapered chamber 66 shown in FIG. 4 may be properly determined.

INDUSTRIAL APPLICABILITY

According to the present invention, there is provided a plasma torch for preferably use in cutting or welding metallic material and from which a significant effect can be obtained since the contact portion between the electrode table and the electrode cannot easily be melted. Furthermore, the plasma torch according to the present invention is effective since the swirler can easily be removed from the nozzle at the time of disassembling the plasma torch.

What is claimed is:

1. A plasma torch comprising a torch body having a hole opening outwardly at one end thereof;

an electrode, an insulating body, a swirler, and a nozzle sequentially positioned in said hole;

said nozzle having a substantially conical leading portion and a substantially cylindrical portion; said nozzle having an outlet opening at the central portion of the substantially conical leading portion; said outlet opening of said nozzle being directed outwardly from said one end of the torch body for jetting out plasma arcs; said substantially cylindrical portion having a first chamber therein with said swirler being positioned in said first chamber with at least a part of the outer wall surface of said swirler confronting the wall surface of said first chamber to thereby releasably fasten said swirler to said nozzle; said substantially cylindrical portion having a second chamber therein extending from said first chamber to the end of said substantially cylindrical portion which is remote from said substantially conical leading portion; the diameter of said second chamber being greater than the diameter of said first chamber; the axial length of said swirler being less than the combined axial length of said first and second chambers.

2. A plasma torch in accordance with claim 1 wherein said second chamber is tapered, with the larger end of said second chamber being at the end of said substantially cylindrical portion which is remote from said substantially conical leading portion.

3. A plasma torch in accordance with claim 1 wherein said first and second chambers are at least substantially cylindrical chambers positioned coaxially with respect to each other.

4. A plasma torch in accordance with claim 1 wherein the depth of said first chamber is less than the axial length of said swirler.

5. A plasma torch in accordance with claim 1 wherein the diameter of said first chamber is only slightly greater than the outer diameter of said swirler.

6. A plasma torch in accordance with claim 1 further comprising a first cap circumscribing said nozzle and secured to said torch body.

7. A plasma torch in accordance with claim 6 wherein said electrode, said insulating body, said swirler, and said nozzle are secured in said hole in the torch body by said first cap.

8. A plasma torch in accordance with claim 7 wherein the depth of said first chamber is less than the axial length of said swirler, and wherein the diameter of said first chamber is only slightly greater than the outer diameter of said swirler.

9. A plasma torch in accordance with claim 8 wherein said second chamber is tapered, with the larger end of said second chamber being at the end of said substantially cylindrical portion which is remote from said substantially conical leading portion.

10. A plasma torch in accordance with claim 7 wherein the depth of said first chamber is less than the axial length of said swirler; wherein said swirler introduces an operating gas in the form of a swirling flow into an annular chamber between said electrode and said nozzle for the formation of the plasma arcs to be jetted out said outlet opening; and further comprising a second cap circumscribing said first cap and secured to said torch body to form an assist gas passageway between said first cap and said second cap, said second cap having an assist gas jetting opening therethrough adjacent said outlet opening of said nozzle to direct a stream of assist gas from said assist gas passageway against a portion of a workpiece to be machined.

11. A plasma torch in accordance with claim 10 wherein the depth of said first chamber is about two-thirds of the length of said swirler in its axial direction.

12. A plasma torch in accordance with claim 1 wherein the depth of said first chamber is about two-thirds of the length of said swirler in its axial direction.

13. A plasma torch in accordance with claim 1 wherein said insulating body is ceramic.

14. A plasma torch in accordance with claim 1 wherein said swirler is positioned in said first chamber with the whole of the outer wall surface of said swirler confronting the wall surface of said first chamber.

15. A plasma torch comprising a torch body having a hole opening outwardly at one end thereof;

an electrode, a ceramic body, a swirler, and a nozzle sequentially positioned in said hole;

said nozzle having a substantially conical leading portion and a substantially cylindrical portion, with the outlet of said nozzle being formed at the central portion of the substantially conical leading portion and directed outwardly from said one end of the torch body; said substantially cylindrical portion having a first chamber therein with said swirler being positioned in said first chamber with at least a part of the outer wall surface of said swirler confronting the wall surface of said first chamber to thereby releasably fasten said swirler to said nozzle; said substantially cylindrical portion having a second chamber therein extending from said first chamber to the end of said substantially cylindrical portion which is remote from said substantially conical leading portion; the diameter of said second chamber being greater than the diameter of said first chamber; the axial length of said swirler being less than the combined axial length of said first and second chambers;

a first cap circumscribing said nozzle and secured to said torch body; and a second cap circumscribing said first cap and secured to said torch body to form an assist gas passageway between said first cap and said second cap; said second cap having an assist gas jetting opening therethrough adjacent the outlet of said nozzle to direct a stream of assist gas from said assist gas passageway against a portion of a workpiece to be machined.

16. A plasma torch in accordance with claim 15 wherein said assist gas jetting opening is positioned so that said stream of assist gas can shield the plasma flow from said electrode to the workpiece to be machined from outside air at the time of performing plasma machining work.

17. A plasma torch in accordance with claim 15 wherein said assist gas passageway is an annular passageway which extends at least generally coaxially with said nozzle.

18. A plasma torch in accordance with claim 15 wherein said first cap releasably secures said electrode, said ceramic body, said swirler, and said nozzle in said hole of said torch body.

19. A plasma torch in accordance with claim 15 wherein said electrode has a longitudinally extending cylindrical portion, wherein said ceramic body has an annular cross section transverse to its longitudinal axis, wherein said ceramic body circumscribes said cylindrical portion of said electrode, wherein said swirler is positioned between said ceramic body and said nozzle, and wherein the outer end of said electrode is spaced from said nozzle to form an annular passageway for an operating gas to pass therethough to the outlet of said nozzle.

20. A plasma torch in accordance with claim 19 wherein said swirler introduces said operating gas into the annular passageway between said electrode and said nozzle in the form of a swirling flow.

* * * * *

UNITED STATES PATENT AND TRADEMARK OFFICE

CERTIFICATE OF CORRECTION

PATENT NO. : 5,233,154

DATED : August 3, 1993

INVENTOR(S) : Kunio Hoarial, et. al.

It is certified that error appears in the above-indentified patent and that said Letters Patent is hereby corrected as shown below:

On the Title page, item [86], change "PCT/JP90/10802" to--PCT/JP90/00802--.

Signed and Sealed this

Fifth Day of April, 1994

Attest:

Bruce Lehman

BRUCE LEHMAN

Attesting Officer

Commissioner of Patents and Trademarks